United States Patent [19]

Ohashi et al.

[11] Patent Number: 5,701,739
[45] Date of Patent: Dec. 30, 1997

[54] AXLE DRIVE UNIT

[75] Inventors: Ryota Ohashi; Hideaki Okada; Toshio Nagai, all of Amagasaki, Japan

[73] Assignee: Kanzaki Kokyukoki Mfg. Co., Amagasaki, Japan

[21] Appl. No.: 514,089

[22] Filed: Aug. 11, 1995

[30] Foreign Application Priority Data

Aug. 11, 1994 [JP] Japan .................... 6-189341

[51] Int. Cl.$^6$ .................... F16D 31/02; F16D 39/00
[52] U.S. Cl. .................... 60/453; 60/488
[58] Field of Search .................... 60/453, 454, 487, 60/488

[56] References Cited

U.S. PATENT DOCUMENTS

| | | |
|---|---|---|
| 3,362,161 | 1/1968 | Flint .................... 60/488 |
| 4,209,984 | 7/1980 | Kittle et al. .................... 60/454 X |
| 4,903,545 | 2/1990 | Louis et al. . |
| 4,905,472 | 3/1990 | Okada . |
| 4,914,907 | 4/1990 | Okada . |
| 5,020,324 | 6/1991 | MacDonald et al. .................... 60/454 X |
| 5,031,403 | 7/1991 | Okada . |
| 5,146,748 | 9/1992 | Okada .................... 60/454 |
| 5,201,692 | 4/1993 | Johnson et al. . |
| 5,311,740 | 5/1994 | Shiba et al. . |
| 5,419,130 | 5/1995 | Ruckgaveer et al. .................... 60/488 X |

*Primary Examiner*—Hoang Nguyen
*Attorney, Agent, or Firm*—Sterne, Kessler, Goldstein & Fox, P.L.L.C.

[57] ABSTRACT

An axle drive unit for facilitating maintenance, such as replacement or cleaning of an oil filter for filtering operating oil. The present invention uses the interior of the housing of the axle drive unit as an oil sump. The axle drive unit has a hydrostatic transmission for driving axles and operating oil supply means for supplying the operating oil to the transmission. A plug-in bore is open at the side wall of the housing opposite to a suction port of the operating oil supply means. The oil filter is inserted into the housing through the plug-in bore and connected to the suction port. The plug-in bore is covered with a cover member for freely opening and shutting the bore. Such construction enables a worker, when inspecting or replacing the oil filter, to remove the cover member from the side wall of the housing while the axle drive unit is being loaded on a vehicle. The oil filter can simply be inserted or removed through the open plug-in bore. The oil filter is horizontally mounted in the housing and avoids other parts of the axle drive unit. At the same time, the oil filter has a sufficient length to obtain an increase in filtration area without reducing ground clearance of the axle drive unit. Additionally, the oil filter is inexpensive to produce.

24 Claims, 20 Drawing Sheets

AXLE DRIVE UNIT

BACKGROUND OF THE INVENTION

1. Field of the Invention

The present invention relates to an axle drive unit provided in a housing with a hydrostatic transmission and an oil filter, in which the oil filter is easy to insert and remove from the axle drive unit.

2. Related Art

A conventional axle drive unit stores lubricating oil in a housing which contains therein a hydrostatic transmission and axles driven thereby. The lubricating oil stored in the housing may be supplied as operating oil to the hydrostatic transmission through an oil filter provided at the bottom of the housing. Examples of this conventional axle drive unit are disclosed in, for example, U.S. Pat. Nos. 4,914,907, 4,903,545, 5,031,403, 5,201,692, and 4,905,472. In a different axle drive unit, the oil filter is detachably mounted to an outer wall of the housing. An example of this type of axle drive unit is disclosed in the U.S. Pat. No. 5,311,740.

For the former axle drive unit construction, in which the oil filter is provided at the bottom of the housing, the axle drive unit must be removed from a vehicle body frame and the housing itself must be dismantled, each time the oil filter is serviced and inspected. This process is very troublesome and time consuming. In the latter axle drive unit construction, in which the oil filter is provided outside the housing, the oil filter may be detachably mounted to the housing. However, the oil filter is expensive to produce and its installation location must be secured. Thus, the area on the housing available for mounting is limited so that the oil filter does not interfere with other parts. Moreover, there is the danger that the vehicle, when running, may be damaged by an obstacle on the ground. Additionally, a specialized tool for the removal of the oil filter is required, whereby the oil filter cannot be removed without such tool.

SUMMARY OF THE INVENTION

The present invention is designed so that the oil filter for filtering operating oil in the housing can easily be detachably mounted to facilitate exchange or maintenance of the oil filter, such as cleaning. A hydrostatic transmission for driving axles is contained in the housing and the interior thereof is used as an oil sump. Operating oil supply means are provided for supplying the operating oil to the transmission, and a suction port of the operating oil supply means is open at the side surface of a charging pump casing which houses a charging pump of the operating oil supply means. A plug-in bore is open on the surface of the wall of the housing and perforates the inside and outside of the wall. The plug-in bore is disposed opposite to the suction port and an oil filter for filtering the oil in the sump is inserted into the housing through the plug-in bore and connected to the suction port. The plug-in bore is covered at the housing by a cover member that freely opens and shuts.

The configuration of the present invention enables a worker to simply insert or extract the oil filter into or from the housing through the open plug-in bore by removing the cover member from the housing while the axle drive unit is disposed on the vehicle body. The oil filter is inserted at the utmost end into the insertion bore in the housing, thereby connecting the oil filter with the suction port. The oil filter is laterally mounted in the housing and is of a sufficient length to increase the overall filtration area, while at the same time avoiding other parts in the housing. Additionally, the oil filter, which is efficiently disposed in a dead space in the housing, does not reduce ground clearance of the vehicle.

These and other objects, features and advantages of the invention will become more apparent upon a reading of the following detailed description and drawings.

DETAILED DESCRIPTION OF THE PREFERRED EMBODIMENTS

Figure 1:
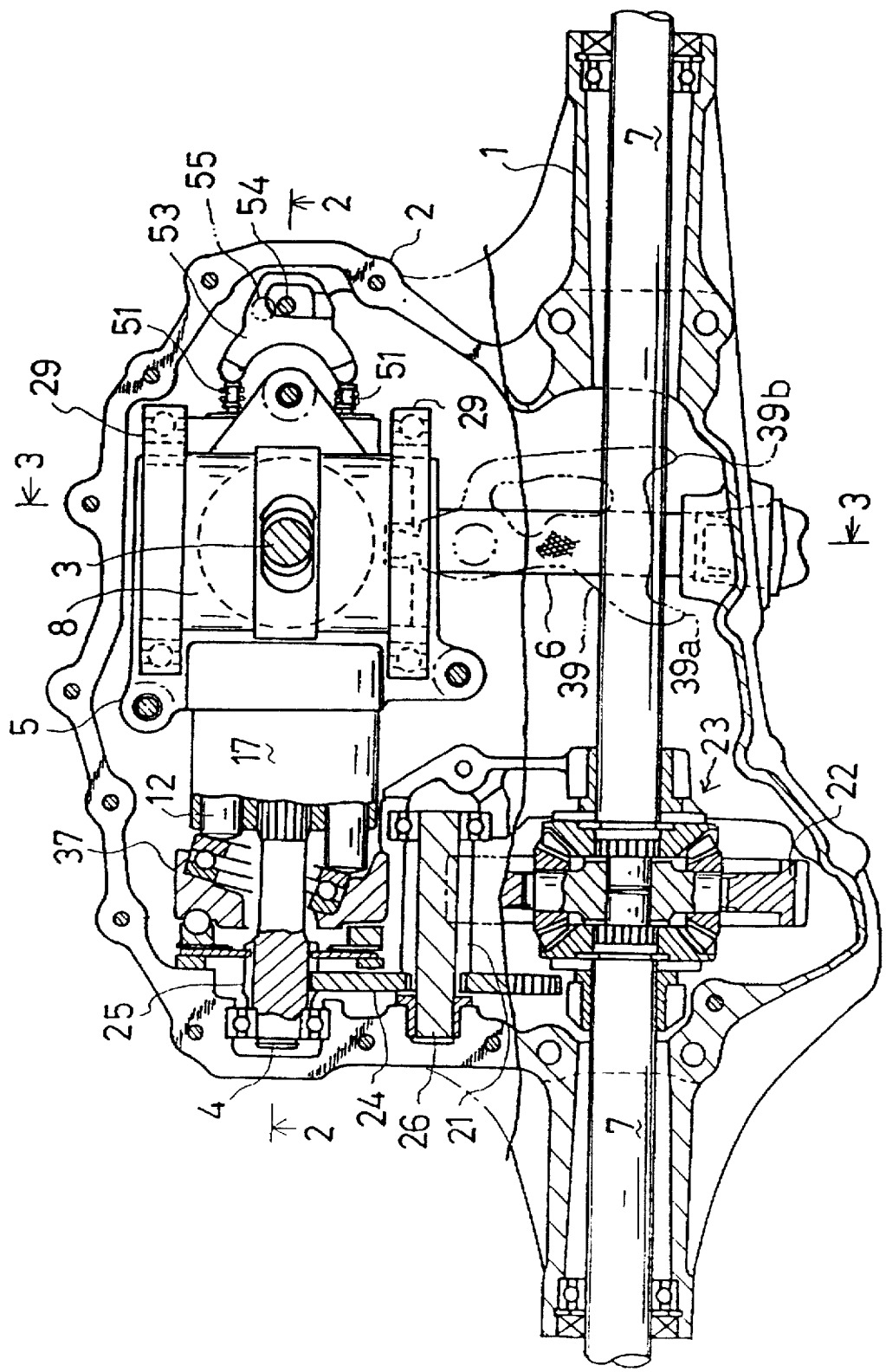
FIG. 1 is a partially sectional plan view of an axle drive unit of the present invention, from which an upper half housing is removed.
Figure 2:
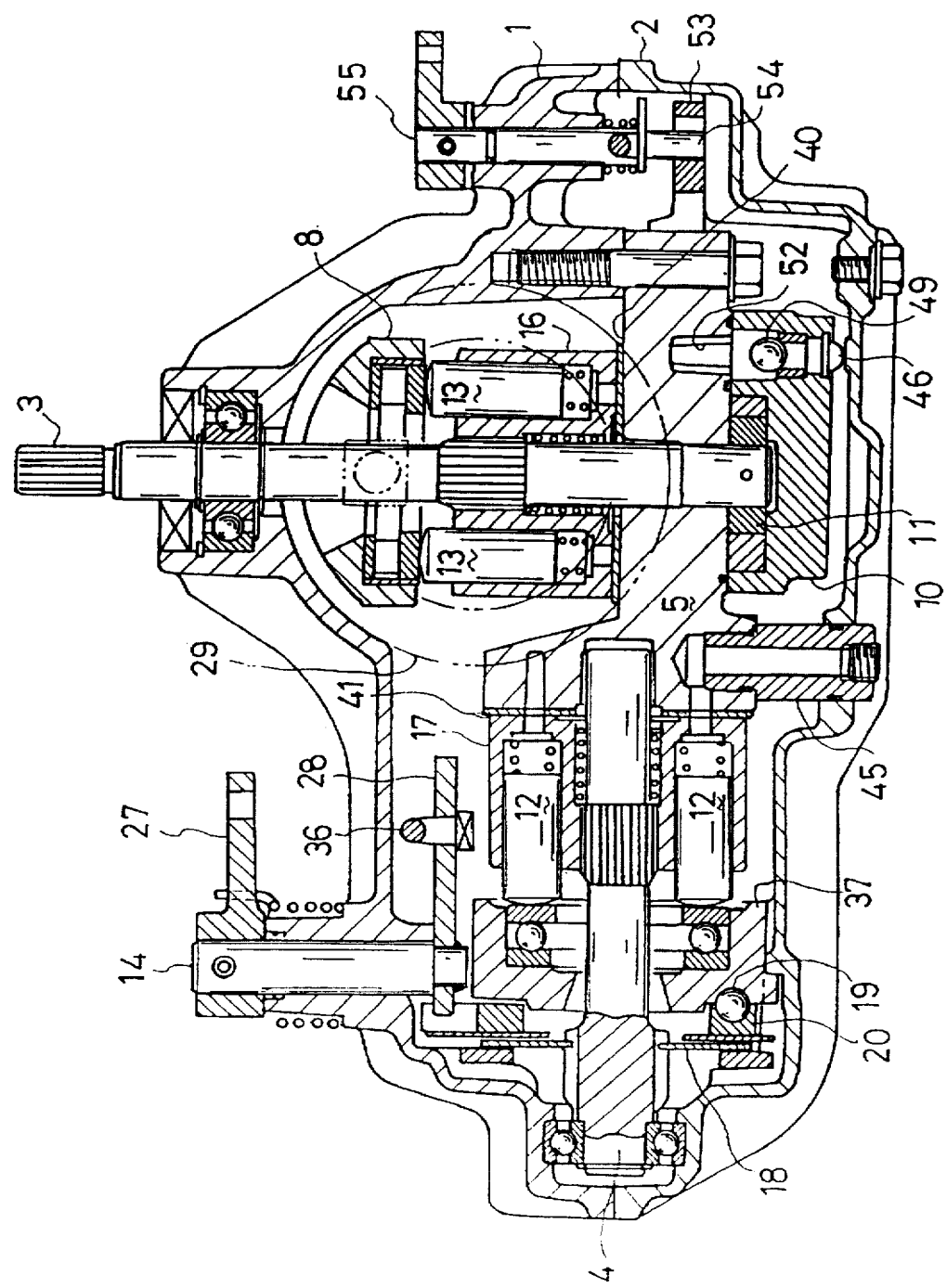
FIG. 2 is a sectional view taken along line 2—2 FIG. 1.
Figure 3:
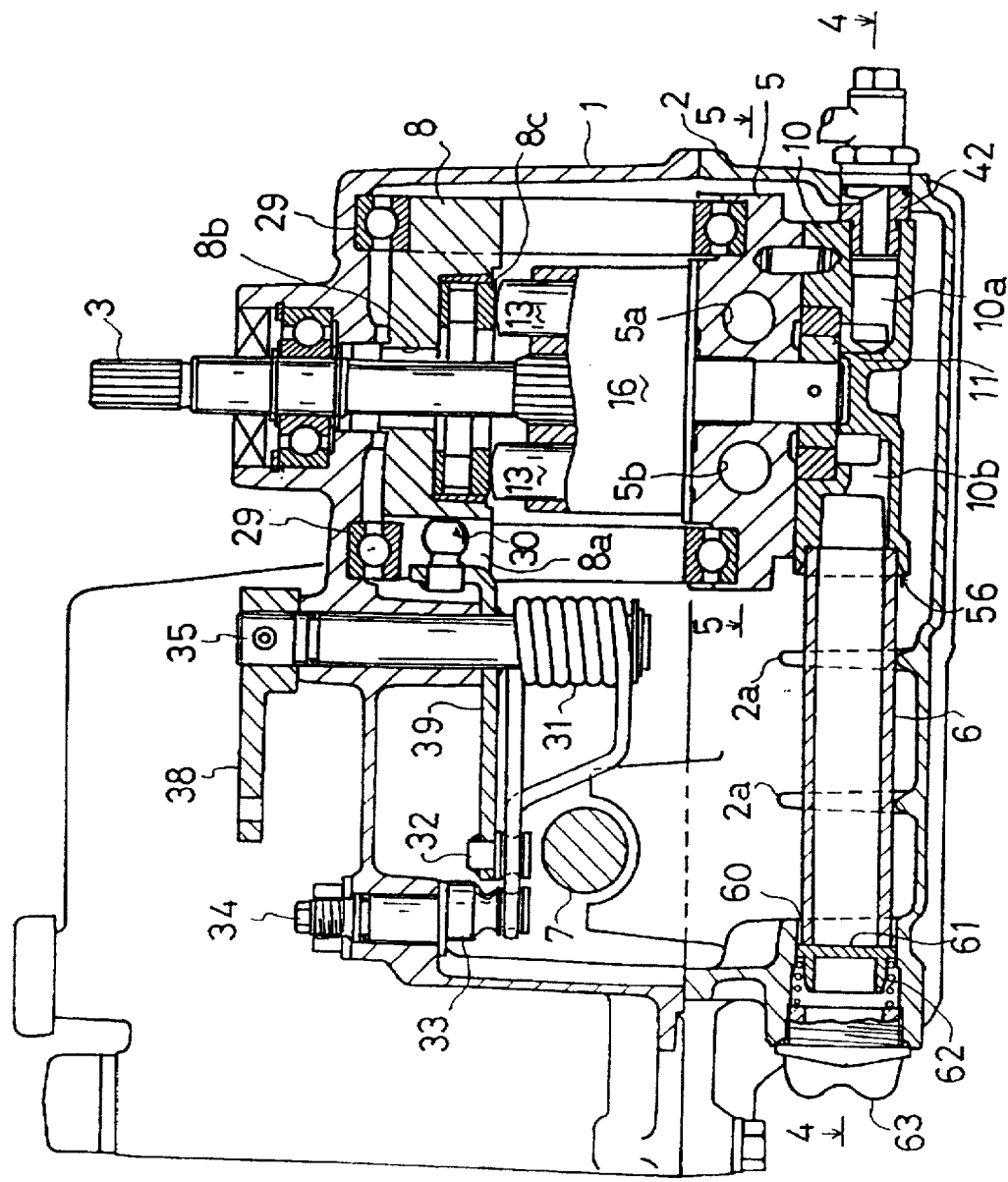
FIG. 3 is a sectional side view of a first embodiment of the present invention taken along line 3—3 in FIG. 1.
Figure 4:
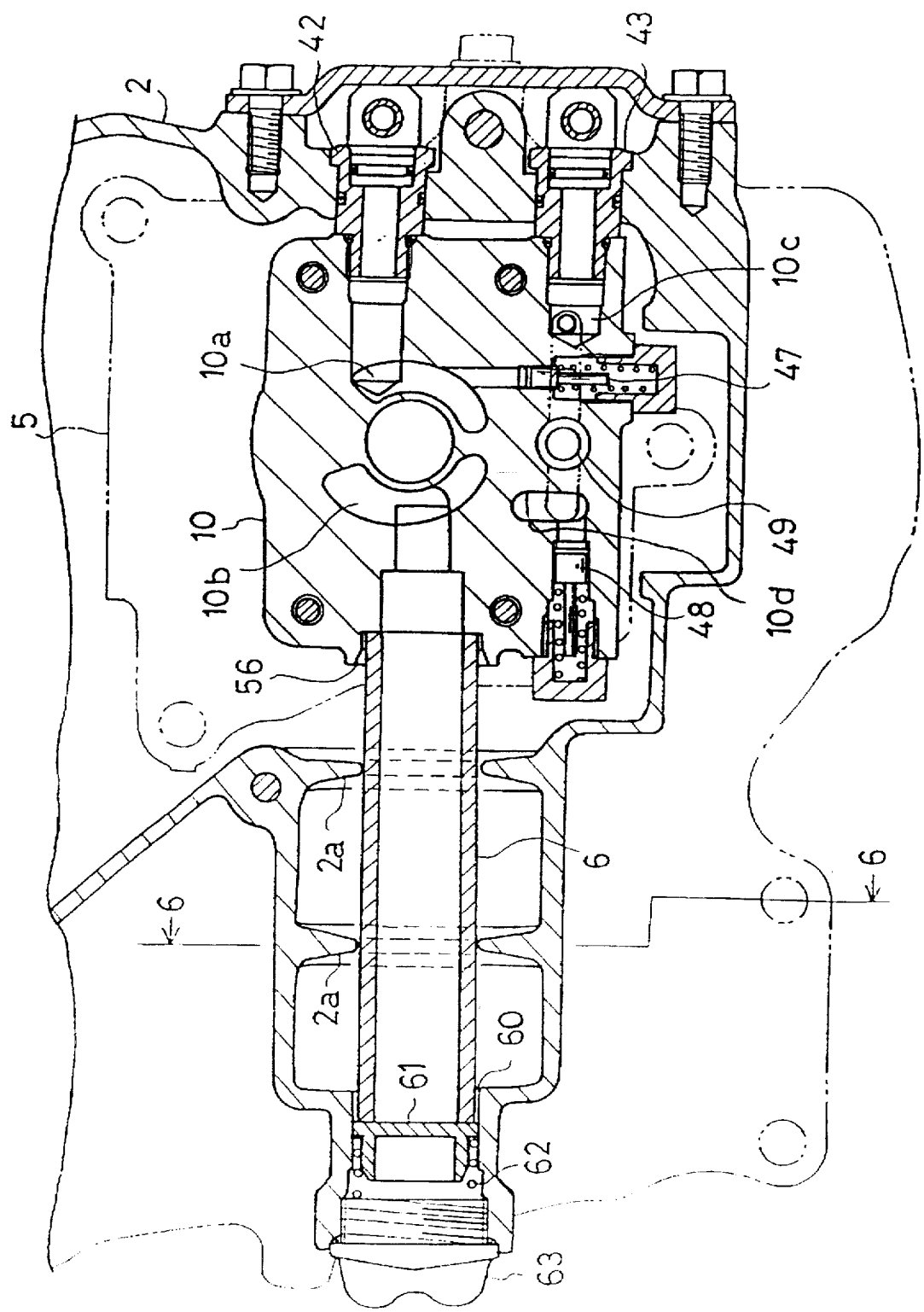
FIG. 4 is a sectional view taken along line 4—4 in FIG. 3.

Referring to FIGS. 1, 2, and 3, a description of the construction of an axle drive unit of the present invention is provided. A housing of the axle drive unit is constructed by coupling an upper half housing 1 and a lower half housing 2 with each other through flat and horizontal joint surfaces around the perimeter of the half housings 1 and 2. The housing is filled with lubricating oil so as to form an oil sump. Bearings for a motor shaft 4 and a counter shaft 26 are provided at the joint surfaces of the housings. Left and right axles 7 are positioned above the joint surfaces of the housing and are rotatably supported in upper half housing 1. A differential gear unit 23, by which axles 7 are mutually differentially coupled is disposed within the housing. Axles 7 each laterally project from opposite ends of the housing.

A center section 5 having a generally L-shape when viewed laterally is mounted to upper half housing 1. The upper horizontal surface of center section 5 coincides with the joint surface of the housing or extends in parallel thereto. A pump attaching surface 40 is formed at the upper horizontal surface and a cylinder block 16 is rotatably disposed thereon. Pistons 13 are fired movably in reciprocation through biasing springs (not shown) into a plurality of cylinder bores formed in cylinder block 16. A pump shaft 3 for receiving power from a prime mover is disposed on the rotary axis of cylinder block 16 and integrally rotates therewith. A movable swash plate 8 with an opening 8b is provided. A pump shaft 3 is inserted in opening 8b, and a thrust bearing 8c is fitted into a lower recess of the swash plate 8. Thrust bearing (or contact surface) 8c of movable swash plate 8 abuts the heads of pistons 13 so as to constitute a hydraulic pump of an axial piston type. Movable swash plate 8 is slantwise movably supported through a pair of bearings 29 interposed between upper half housing 1 and center section 5. The contact surface 8c of movable swash plate 8 is slantwise operated with respect to cylinder block 16, thereby changing the discharge amount and discharge direction of oil discharged from the hydraulic pump.

The slantwise operation mechanism for movable swash plate 8 is now described. As shown in FIG. 3, a control shaft 35, having a control lever 38 fixedly secured thereon, is operated from the exterior of the housing. Control shaft 35 vertically perforates upper half housing 1 and is supported thereto. A swinging arm 39 is fixed to a portion of control shaft 35 positioned in the housing. The neutral return spring 31 is fitted onto the lower portion of control shaft 35. A pin 32 projects from one end of swinging arm 39 and abuts against both ends of neutral return spring 31. Swinging arm 39 is upwardly bent at the other end and has a ball member 30 fixed thereto. Ball member 30 engages an engaging groove 8a of movable swash plate 8 through a joint block. Control shaft 35 rotates to horizontally move ball portion 30, so that swash plate 8 is laterally slanted to perform an output change of the hydraulic pump.

An adjusting screw bolt 34 for adjusting the neutral position of movable swash plate 8 is vertically mounted with respect to upper half housing 1. A pin 33 is provided at the lower end of the adjusting screw bolt 34 and abuts against both the ends of neutral return spring 31. Thus, adjusting screw bolt 34 is rotated to shift pin 33, thereby adjusting the neutral position of swinging arm 39. When swinging arm 39 rotates, one end of neutral spring 31 is open by pin 32, and swinging arm 39 is subjected to a return force toward the neutral position. Also, swinging arm 39, as shown in FIG. 1, is provided with engaging projections 39a and 39b which abut fixing pin 33 to limit the slanting movement of movable swash plate 8.

The outside vertical surface of center section 5 forms a motor attaching surface on which a cylinder block 17 is rotatably disposed. A plurality of pistons 12 are fitted movably in reciprocation through biasing springs (not shown) in a plurality of cylinder bores formed at cylinder block 17. The heads of pistons .12 abut a contact surface (or thrust bearing) of a fixed swash plate 37. Fixed swash plate 37 is disposed between upper half housing 1 and lower half housing 2. A motor shaft 4 is integrally rotatably disposed on the rotary axis of cylinder block 17 to constitute a hydraulic motor of an axial piston type.

A gear 25 is provided on motor shaft 4 and engages with a larger diameter gear 24 fixedly disposed on a counter shaft 26. A smaller diameter gear 21, also fixedly disposed on counter shaft 26, engages with a ring gear 22 of differential gear unit 23. Ring gear 22 drives differential gear unit 23 to transmit power to left and right axles 7 through differential gear unit 23. A brake operating shaft 14 is vertically supported to upper half housing 1 and a brake arm 27 is fixed to the upper end of brake operating shaft 14 outside the housing. An arm 28 is fixed to the lower end of the brake operating shaft 14 inside the housing. One end of arm 28 engages with a projection of a brake actuator 20 through a cam. When brake arm 27 is operated, brake actuator 20 moves by a cam ball 19 held to fixed swash plate 37 toward a braking friction plate 18 fixed to motor shaft 4. Braking friction plate 18 is disposed between brake actuator 20 and the housing so as to exert the braking action to motor shaft 4. A link 36 is connected to the other end of arm 28 and interlocks with swinging arm 39 through an interlocking mechanism (not shown). Hence, when brake operating shaft 14 is operated to exert the braking action to motor shaft 4, swash plate 8 of the hydraulic pump is forcibly returned to the neutral position to cut off the drive of motor shaft 4.

Figure 7:
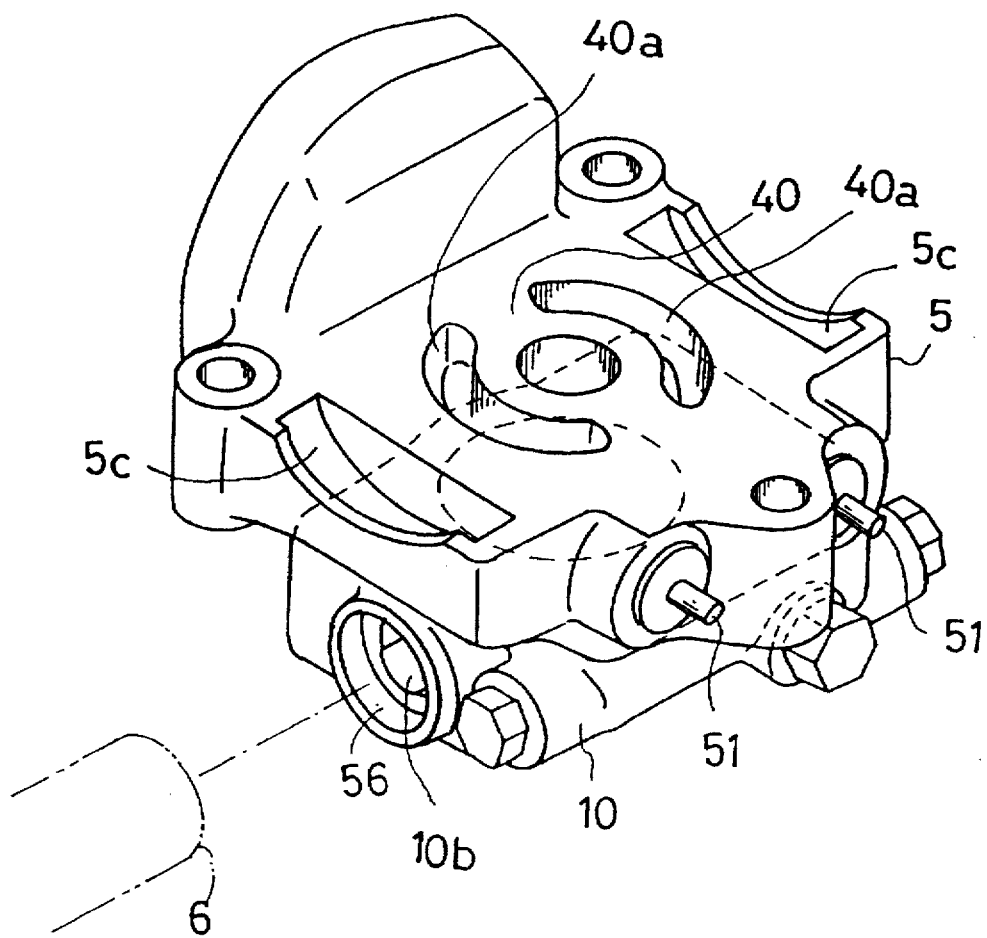
FIG. 7 is a perspective view of a center section and a charging prop casing of the first embodiment of the invention.

At pump attaching surface 40 of center section 5, as shown in FIG. 7, a first pair of kidney ports 40a are open so that feed or discharge oil is introduced therein from cylinder block 16. At motor attaching surface 41 a second pair of kidney ports (not shown) are open so that feed or discharge oil is introduced therein from cylinder block 17. Oil passages for connecting the pairs of kidney ports with each other are provided in center section 5 to circulate oil between the hydraulic pump and the hydraulic motor to thereby constitute a closed fluid circuit. Oil passages 5a and 5b (shown in FIG. 3) form the closed circuit. The movable displacement hydraulic pump and fixed displacement motor are hydraulically connected through the closed circuit so as to constitute a hydrostatic transmission. The capacity of the hydraulic pump varies whereby the hydraulic motor achieves stepless output rotation.

Center section 5 is provided with lubrication pipes 45 (shown in FIG. 2). The utmost ends thereof project outwardly from the outside bottom surface of lower half housing 2. The ends of lubrication pipes 45 are closed with blind plugs after being filled with operating oil. On the upper horizontal surface of center section 5, as shown in FIG. 7, arc-shaped grooves 5c are formed for holding parts of outer rings of bearings 29 for supporting movable swash plate 8.

As shown in FIG. 3, a charging pump casing 10 is attached to the lower horizontal surface of center section 5. A trochoid charging pump 11 is disposed in charging pump casing 10. Charging pump 11 is driven by the lower end of pump shaft 3 which projects downwardly from the lower horizontal surface of center section 5. The charging pump casing 10 is disposed in the oil sump in the housing and is provided with a discharge port 10a and a suction port 10b for connecting a discharge section and a suction section of charging pump 11, respectively. A bottom insertion bore 56 is provided at the side surface of charging pump casing 10 opposite to the inner surface of a side wall of lower half housing 2. Suction port 10b is open at the bottom portion of insertion bore 56. An oil filter 6, to be discussed below, is inserted into insertion bore 56 and adapted to connect with suction port 10b. The layout of the oil filter obviates the need for a protrusion at the bottom of lower half housing 2 as in conventional axle drive units. Thus, the present invention increases the ground clearance of the axle drive unit.

Charging pump 11 is driven by pump shaft 3, and takes in, through suction port 10b, oil filtered by oil filter 6 and stored in the housing. Charging pump 11 also discharges the oil to discharge port 10a, to compensate for shortages of oil in the closed circuit caused by a leak or the like.

In this embodiment, pressurized oil discharged from charging pump 11 is further used for driving an external hydraulic actuator (not shown) provided outside the housing. A pair of pipe members 42 and 43 are mounted at the other side surface of charging pump 10, so that the utmost ends of pipe members 42 and 43 are exposed from the outside surface of lower half housing 2. Pipe member 42 connects with discharge port 10a, whereby the pressurized oil discharged from charging pump 11 is discharged from the housing through pipe member 42 and drives the external hydraulic actuator. Return oil from the external hydraulic actuator is returned through pipe member 43 to return port 10c at charging pump casing 10 in the housing and supplies the operating oil to the closed circuit through a route to be discussed below.

Charging pump casing 10 houses an actuator relief valve 47 for adjusting the oil pressure when the discharge oil from charging pump 11 drives the external hydraulic actuator and a charge relief valve 48 for properly adjusting oil pressure supplied to the closed circuit. In addition, charging pump casing 10 also houses a first check valve 49. In an alternate embodiment, the axle drive unit is modified to directly connect discharge port 10a and return port 10c in charging pump casing 10. In this embodiment, charging pump 11 does not drive the external actuator, and thus, pipe members 42 and 43 and actuator relief valve 47 are not needed.

Figure 5:
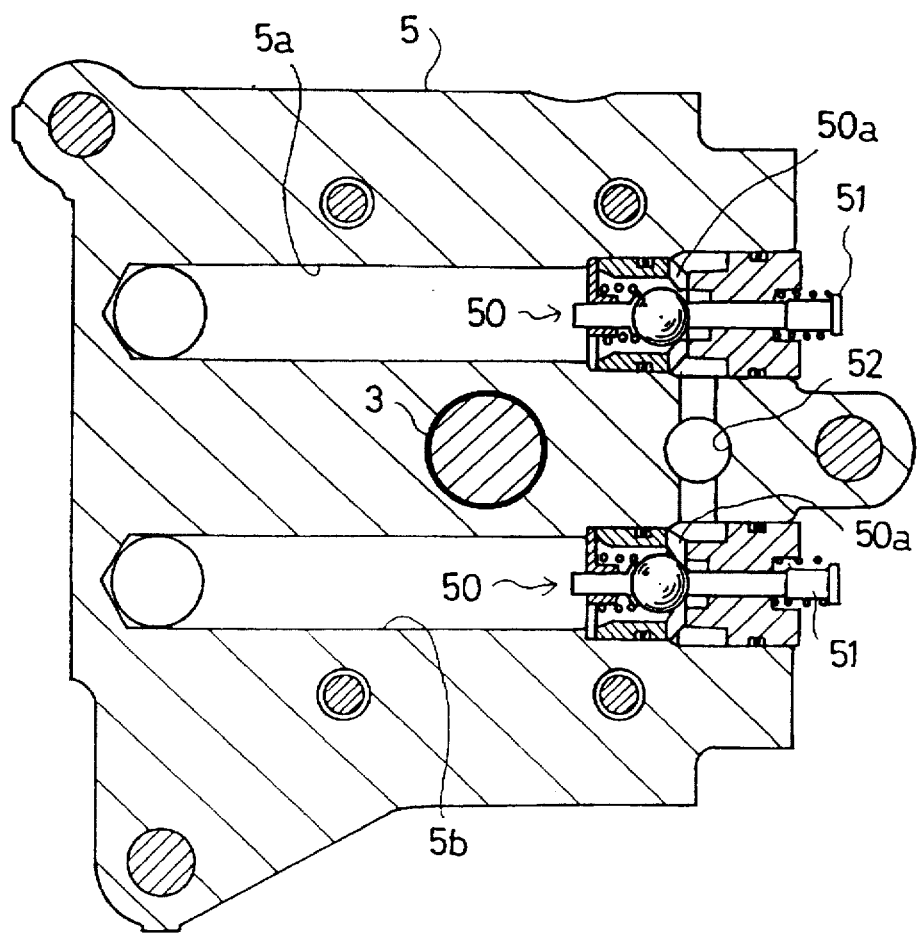
FIG. 5 is a sectional view taken along line 5—5 in FIG. 3.

A pair of second check valves 50, as shown in FIG. 5, are disposed at open ends of a pair of oil passages 5a and 5b constituting the closed circuit of center section 5. A passage 52 for mutually connecting a pair of inlet ports 50a of second check valves 50 is open at the lower horizontal surface of center section 5. At the joint surface of charging pump casing 10 opposite to the lower horizontal surface of center section 5, return port 10c and an oil passage 10d are open. Oil passage 10d and return port 10c communicate with charge relief valve 48, so that center section 5 couples with charging pump casing 10 so as to connect passage 52, return port 10c and oil passage 10d with each other. Thus, the pressure oil discharged from charging pump 11 can be adjusted to have a proper pressure by opening the low pressure side of one of second check valves 50, thereby always supplying oil to the closed circuit.

Passage 52 connects with the secondary passage of first check valve 49 provided at charging pump casing 10. First check valve 49 is provided to handle a situation in which the operating oil supply by charging pump 11 is not sufficient. When the lower pressure side of the closed circuit becomes negative in pressure, first check valve 49 is opened. Lubricating oil in the housing is sucked into the closed circuit through passage 52 and second check valves 50, and is filtered by oil filter 46.

As shown in FIGS. 1 and 5, push rods 51, which can be used to open second check valves 50 from the exterior of the housing, project from center section 5. In order to simultaneously push push rods 51 to open both check valves 50 so as to release the closed circuit of the hydrostatic transmission, as shown in FIGS. 1 and 2, a single by-pass operation member 53 is used. By-pass operation member 53 has a C-shape for allowing free rotation of the hydraulic motor and it abuts the outer ends of push rods 51. By-pass operation member 53 engages with a cam pin 54 provided at the lower end of by-pass lever shaft 55. Thus, when the vehicle is pulled, by-pass lever shaft 55 is rotated to press the rear of by-pass operating member 53 and both the utmost ends thereof simultaneously press push rods 51, whereby check valves 50 are open to freely rotate the hydraulic motor.

The lubricating oil filtered by oil filter 6 in the housing is used as the operating oil supplied to the closed circuit. In the preferred embodiment, oil filter 6 is a cylindrical and elongate member moulded of porous material. Conventional porous materials, such as, cellulose, chemical fiber, chemically formed plastic, phenolic laminate or thin steel wire mesh can be used. In the preferred embodiment, cellulose is layered to form an elongate cylindrical oil filter. Thus, a hyperfine structure can be obtained, and the surface area of the filter is increased so that filtration precision is improved while passing resistance is decreased. Also, it is advantageous to manufacture the oil filter at a low cost.

At a portion of the side wall of lower half housing 2 opposite to insertion bore 56 at charging pump 10 and substantially on the same axis as insertion bore 56, a plug-in bore 60, somewhat larger in diameter than oil filter 6, is open. A cover member 63 is screwably attached to the opening end of plug-in bore 60 so that plug-in bore 60 may be open or shut as desired. Oil filter 6, when inserted into the housing through open plug-in bore 60, is supported at the outer periphery of the utmost end of oil filter 6 by the inner peripheral surface of insertion bore 56 of charging pump casing 10. Oil filter 6 is supported at the outer periphery of the base by the inner peripheral surface of plug-in bore 60.

Thus, oil filter 6 is stably supported in the oil sump in the housing. Oil filter 6 is set longitudinally and substantially horizontally in the oil sump in the housing. Oil filter 6 is also set longitudinally and substantially at a right angle with respect to the axes of axles 7, and disposed in a space below one axle 7, thereby enabling oil filter 6 to be given a sufficient length.

Figure 6:
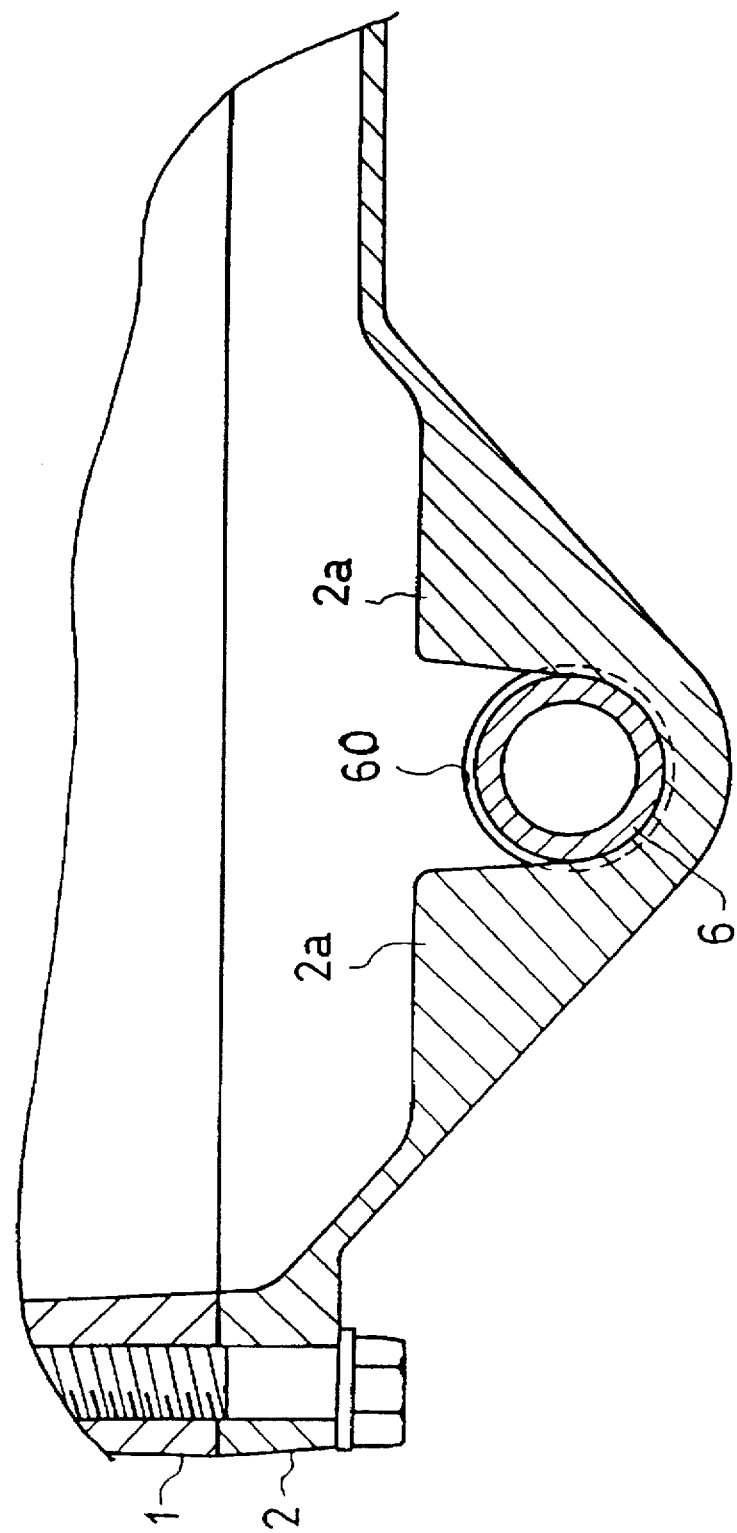
FIG. 6 is a sectional view taken along line 6—6 in FIG. 4.

A plurality of ribs 2a project from the inner bottom surface of lower half housing 2 and are disposed in a row longitudinally of oil filter 6 in order to accurately guide the utmost end of oil filter 6 into insertion bore 56. Ribs 2a, as shown in FIG. 6, each are U-shaped at the periphery for guiding oil filter 6. Ribs 2a are integrally molded along with lower half housing 2. Oil filter 6, when inserted into the housing, can accurately be guided, while being sequentially guided at the outer peripheral surface of oil filter 6 by the periphery of each rib 2a, into insertion bore 56 without slanting.

Also, because oil filter 6 is cylindrical and open at both axial ends, the following bias means are adapted to prevent the unfiltered oil from entering oil filter 6.

Figure 8:
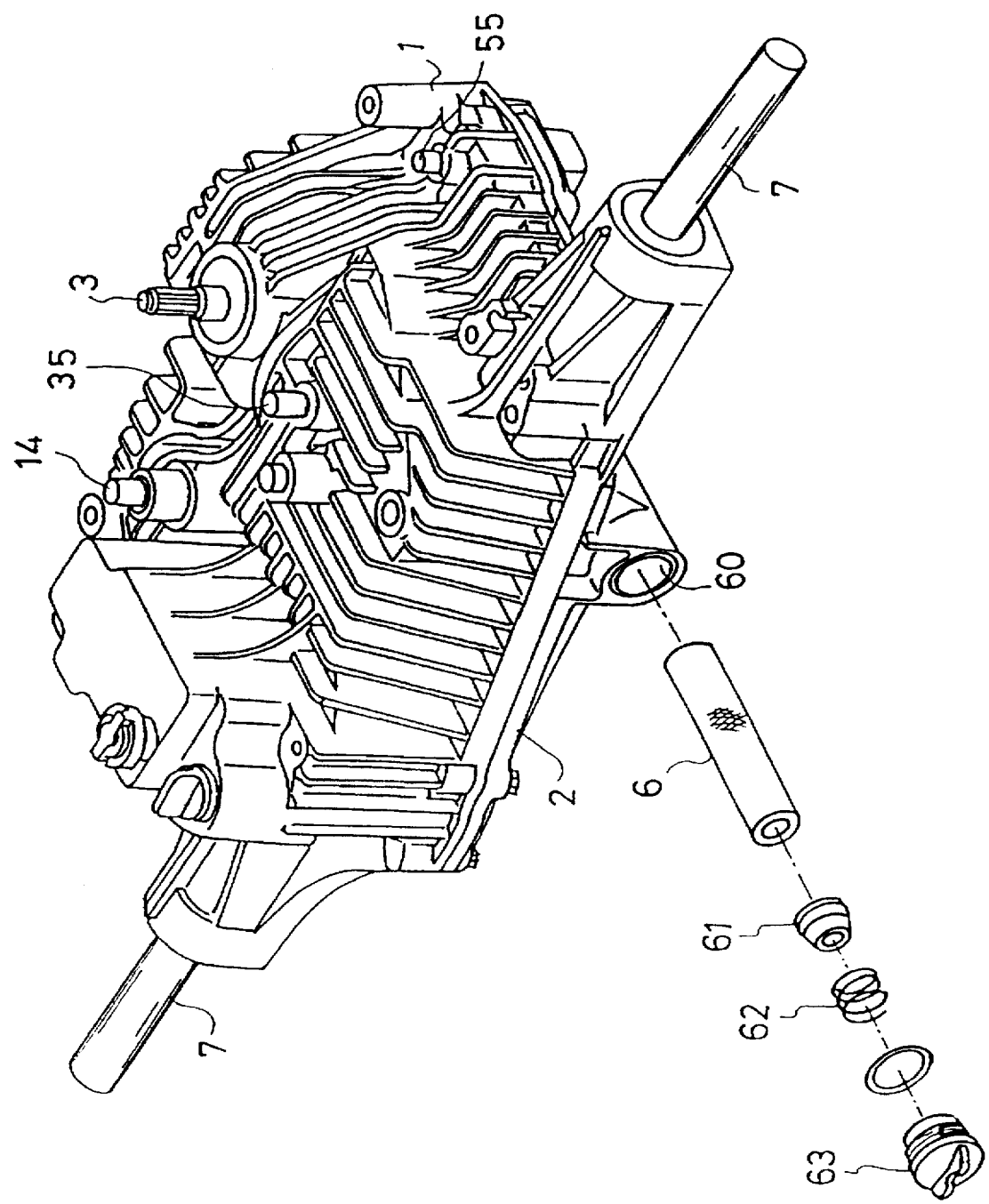
FIG. 8 is a perspective view showing removal of an oil filter from a housing of the axle drive unit.
Figure 17:
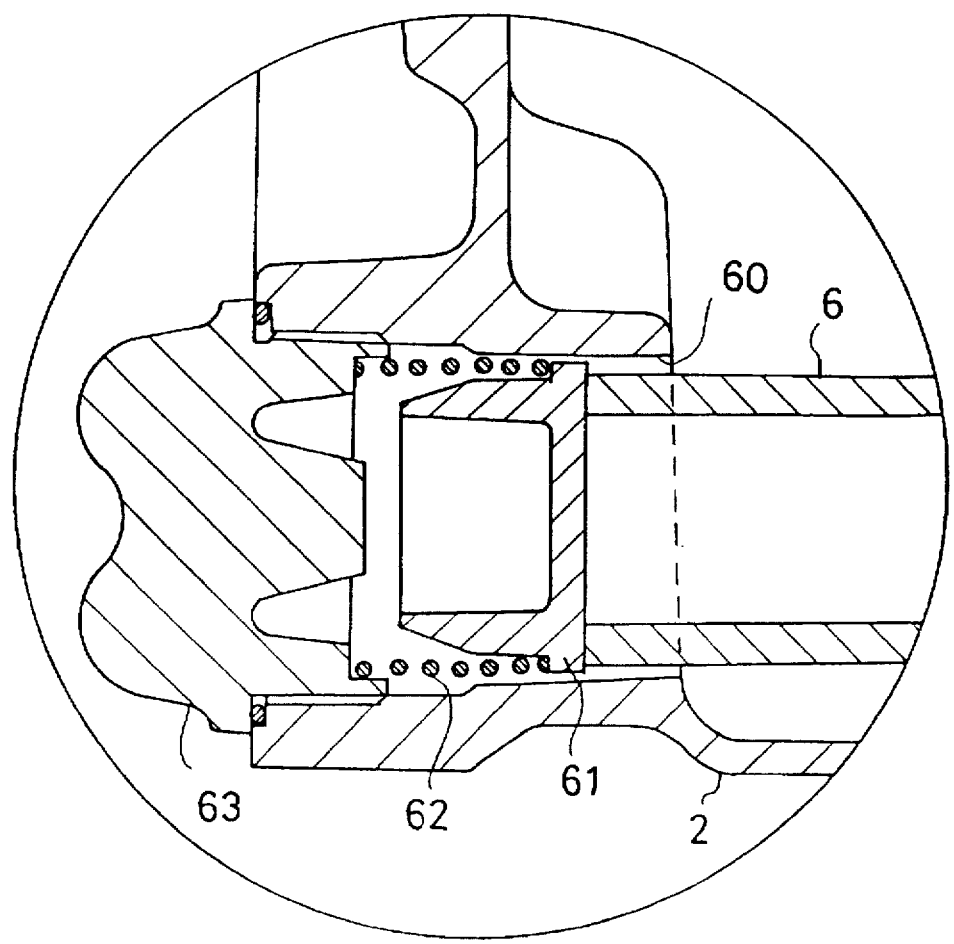
FIG. 17 is a sectional side view of a first embodiment of a cap for the present invention.

In detail, as shown in FIGS. 8 and 17, in FIG. 17, a cap 61 abuts the end face of the base of oil filter 6 and a coil spring (or biasing means) 62 is interposed between cap 61 and cover member 63. When cover member 63 is mounted to oil filter 6, the opening face of the base of oil filter 6 is permanently closed by cap 61. Also, the opening face of the utmost end of oil filter 6 comes into close contact with the bottom of insertion bore 56 at charging pump casing 10, so that only the oil filtered at the outer peripheral surface of oil filter 6 exists therein.

Figure 9:
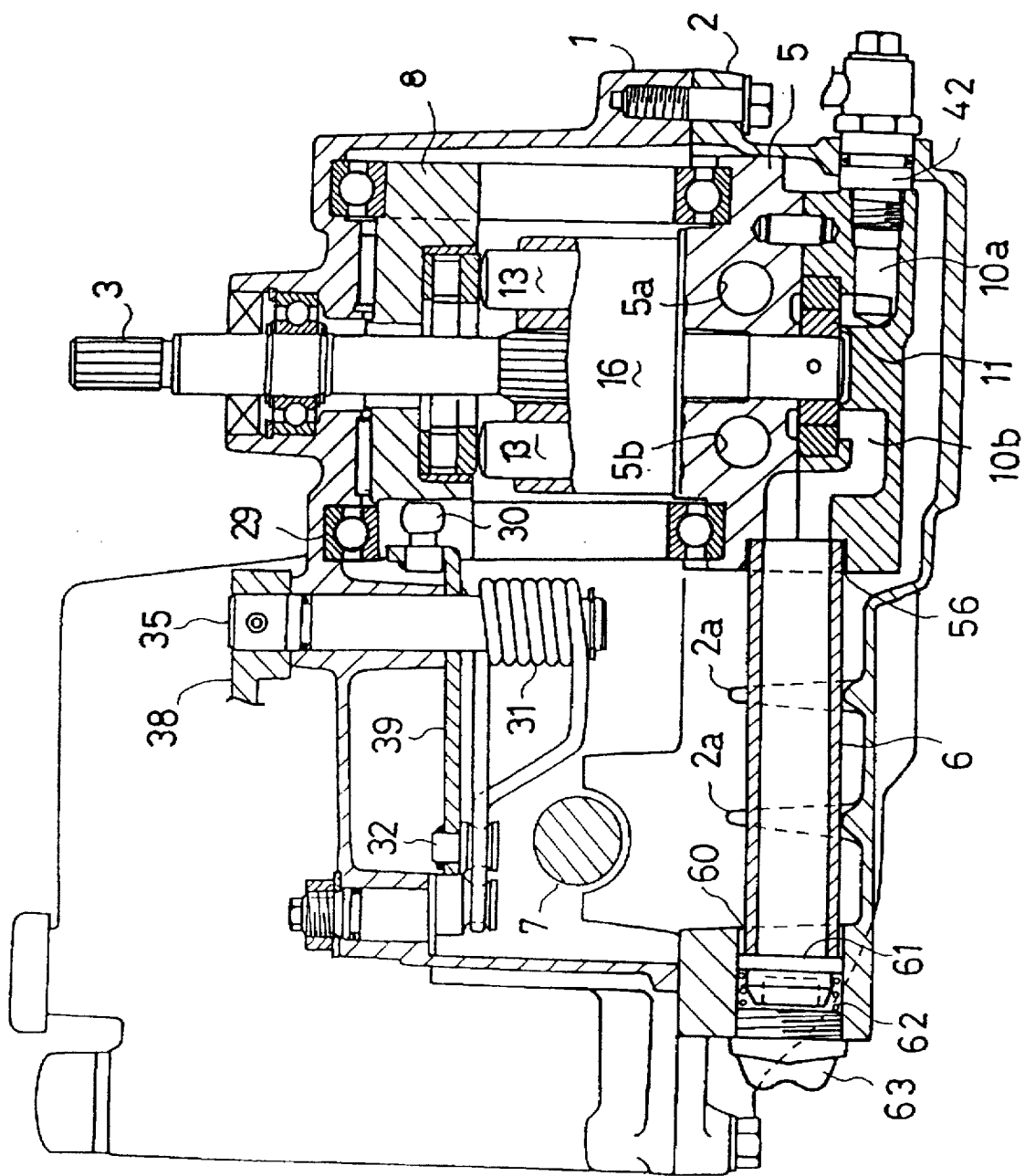
FIG. 9 is a sectional side view of a second embodiment of the present invention similar to FIG. 3.
Figure 10:
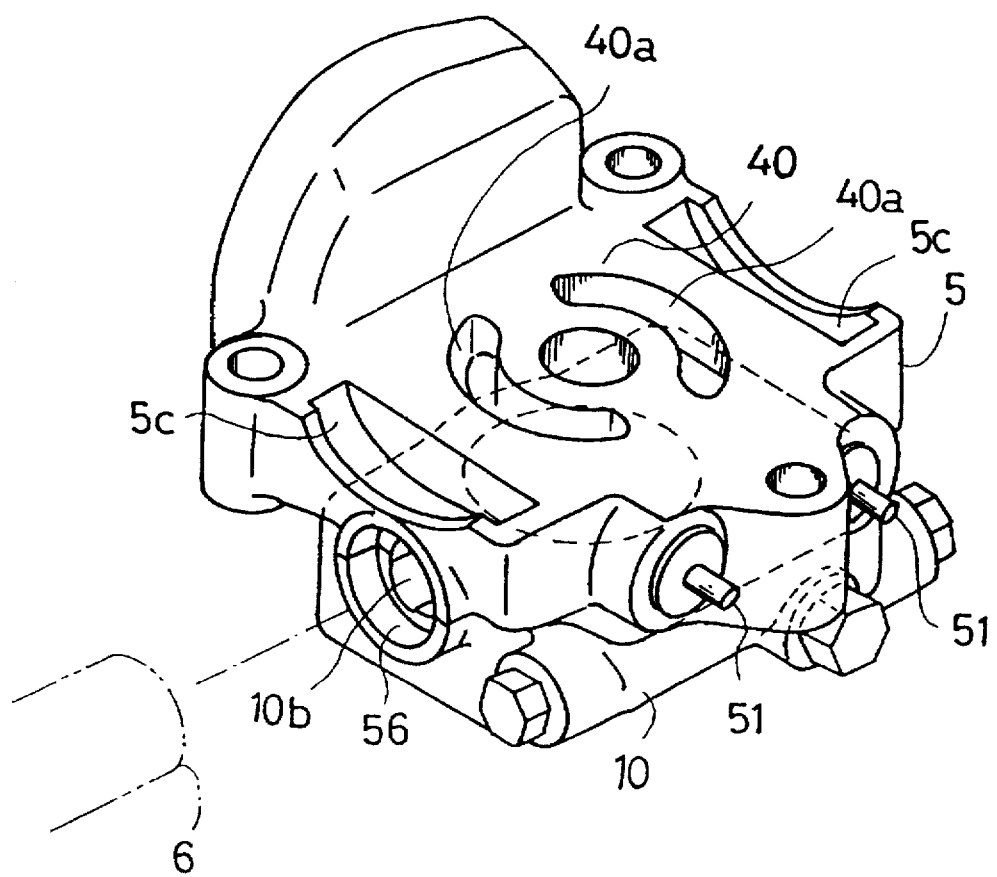
FIG. 10 is a perspective view of a center section and a charging pump casing of the second embodiment of the invention.

In a first embodiment of the present invention, as shown in FIGS. 3, 7, and 8, insertion bore 56 for oil filter 6 is open at the side wall of charging pump casing 10. In a second embodiment of the present invention, as shown in FIGS. 9 and 10, insertion bore 56 is formed across the joint surface between charging pump casing 10 and center section 5. Semicircular projections are formed at both the side surfaces of charging pump casing 10 and center section 5 so that both projections, when coupled, form a substantially round insertion bore 56 for receiving therein the utmost end of oil filter 6. Suction port 10b is in fluid communication with the intake section of insertion bore 56. Suction port 10b also spans the joint surface of charging pump casing 10 and center section 5. Otherwise, construction of the second embodiment is similar to that of the first embodiment, so that further explanation of like reference numerals is omitted.

Figure 11:
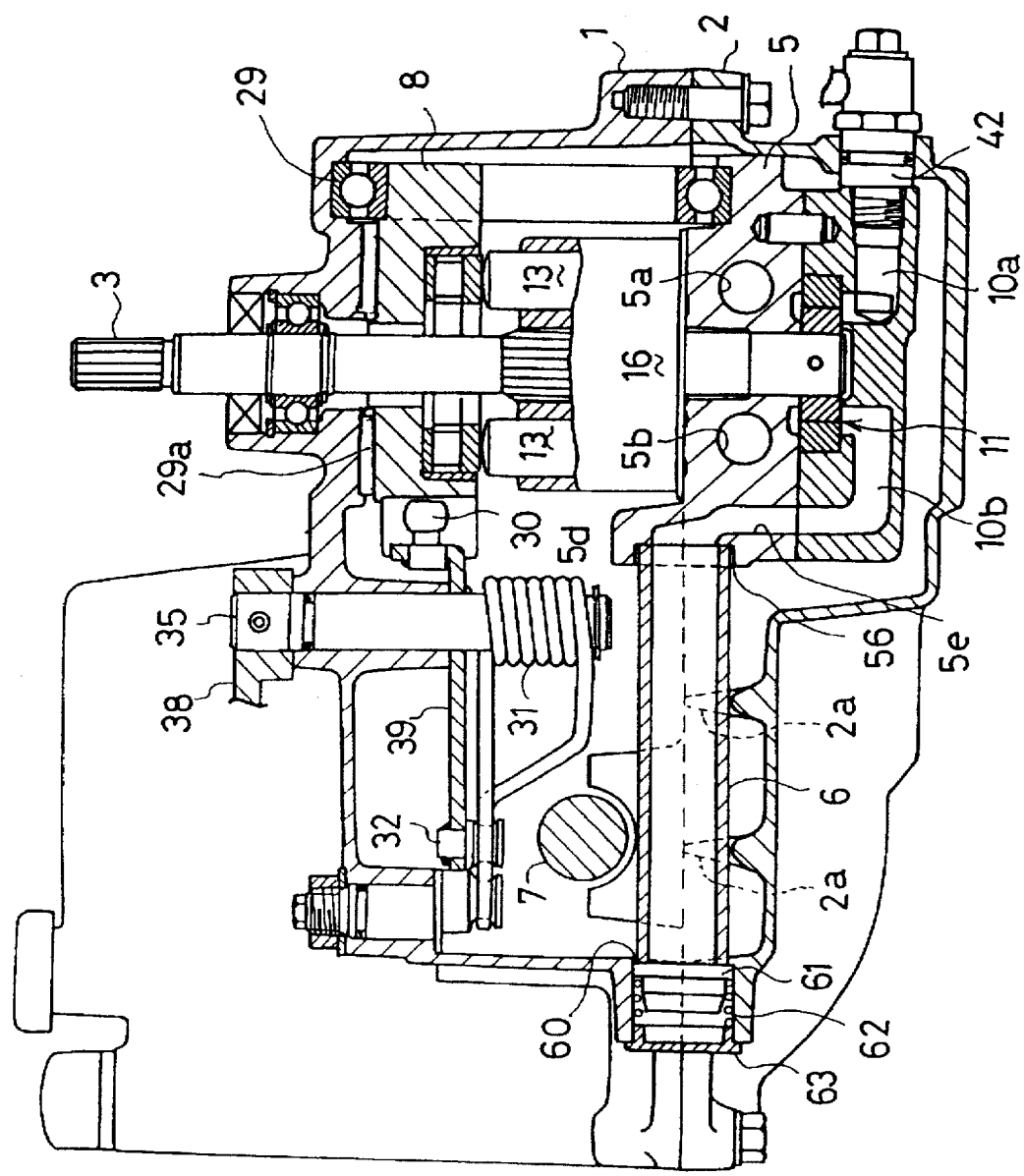
FIG. 11 is a sectional side view of a third embodiment of the present invention similar to FIGS. 3 and 9.
Figure 12:
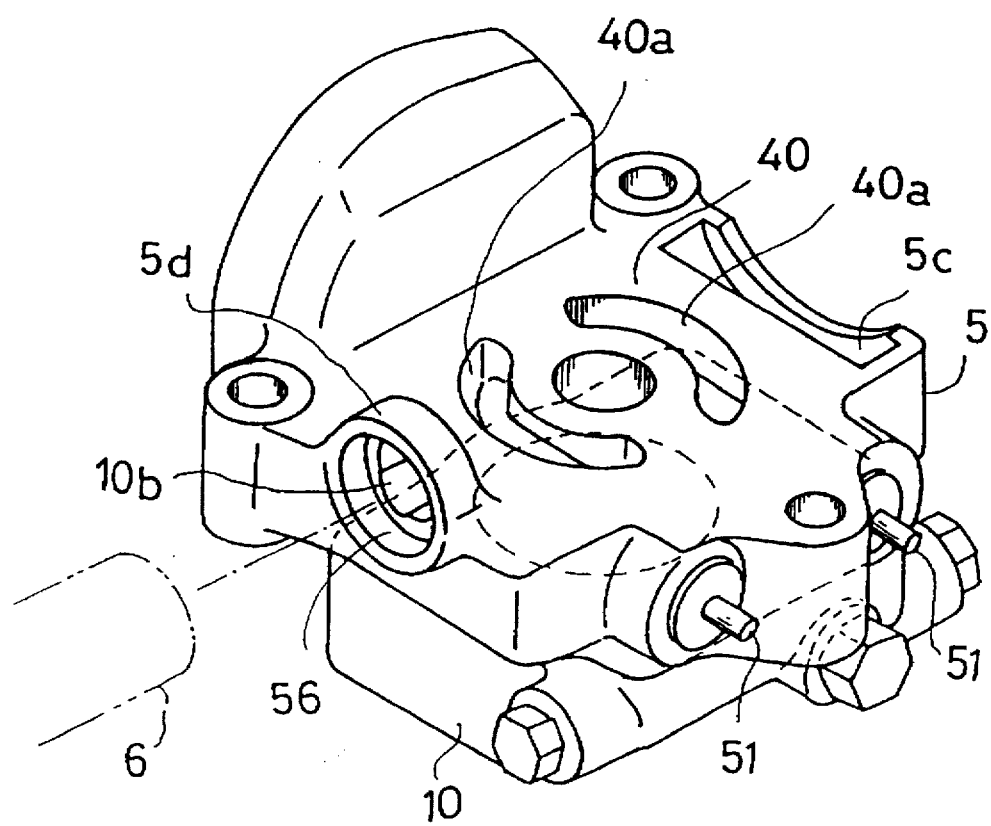
FIG. 12 is a perspective view of a center section and a charging pump of the third embodiment of the invention.
Figure 13:
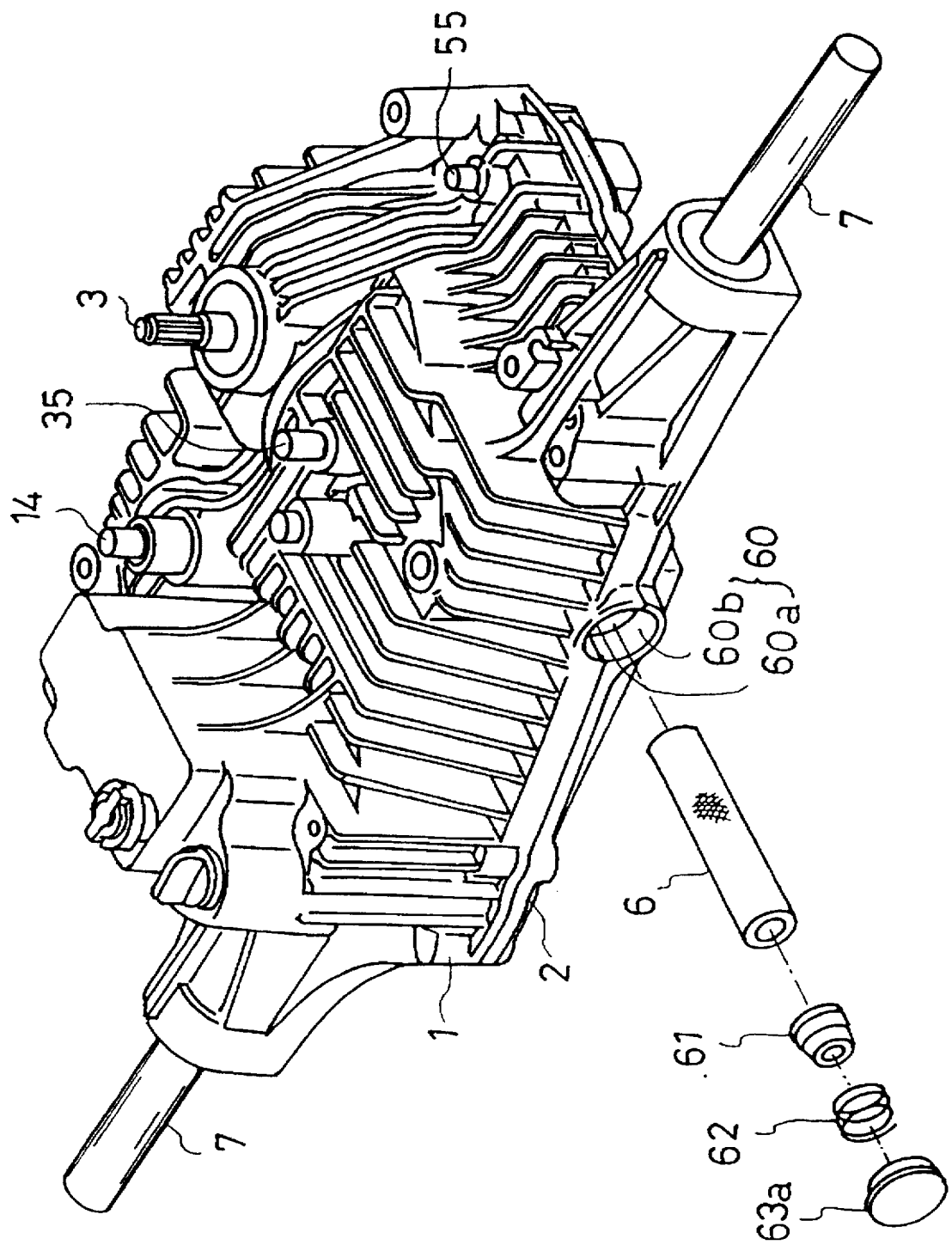
FIG. 13 is a perspective view showing the removal of the oil filter from the housing.

In a third embodiment of the present invention, as shown in FIGS. 11 and 12, a flange 5d is integrally formed at the side surface of center section 5 in continuation thereof. An insertion bore 56 having a circular cross section is provided at flange 5d. Suction port 10b of charging pump casing 10 is open in the bottom of insertion bore 56 through a passage 5e provided in center section 5. In this embodiment, it is possible to position the axis of plug-in bore 60 in the same plane as the joint surface of the housing. Accordingly, when upper half housing 1 and lower half housing 2 are molded, semicircular plug-in bores 60a and 60b are symmetrically provided at the joint surface of the side wall, thereby enabling plug-in bore 60 to be formed by joining half housings 1 and 2. Thus, no machining is required to form plug-in bore 60. Cover member 63 for opening and shutting plug-in-bore 60 is not screwably attached to the housing as in the preferred embodiment. Instead, an elastic cap of rubber or the like is used for cover member 63. In addition, a movable swash plate 8 comprises a combination of one bearing 29 and one bearing plate 29a and is swingably supported by bearing 29. Otherwise, construction of this embodiment is similar to that of the first embodiment so that further explanation of like reference numerals is omitted.

The oil filter of the second embodiment is configured to raise the oil filter in the oil sump when compared with the first embodiment. The third embodiment further raises the oil filter in the oil sump. The higher the position of the oil filter in the oil sump, the less the oil filter is affected by iron powder in the bottom surface of the housing. Thus, the higher oil filter position reduces clogging of the oil filter, thereby reducing the frequency with which the oil filter must be replaced.

The above-mentioned embodiments use charging pump 11 as the operating oil supply means. However, the present invention is also applicable to another embodiment, which omits the charging pump. In this embodiment, when there is a shortage of operating oil in the closed circuit due to leakage, the suction of the hydraulic pump itself is adapted to supply the operating oil in the housing to the low pressure side of the closed circuit so as to constitute the operating oil supply means.

Figure 14:
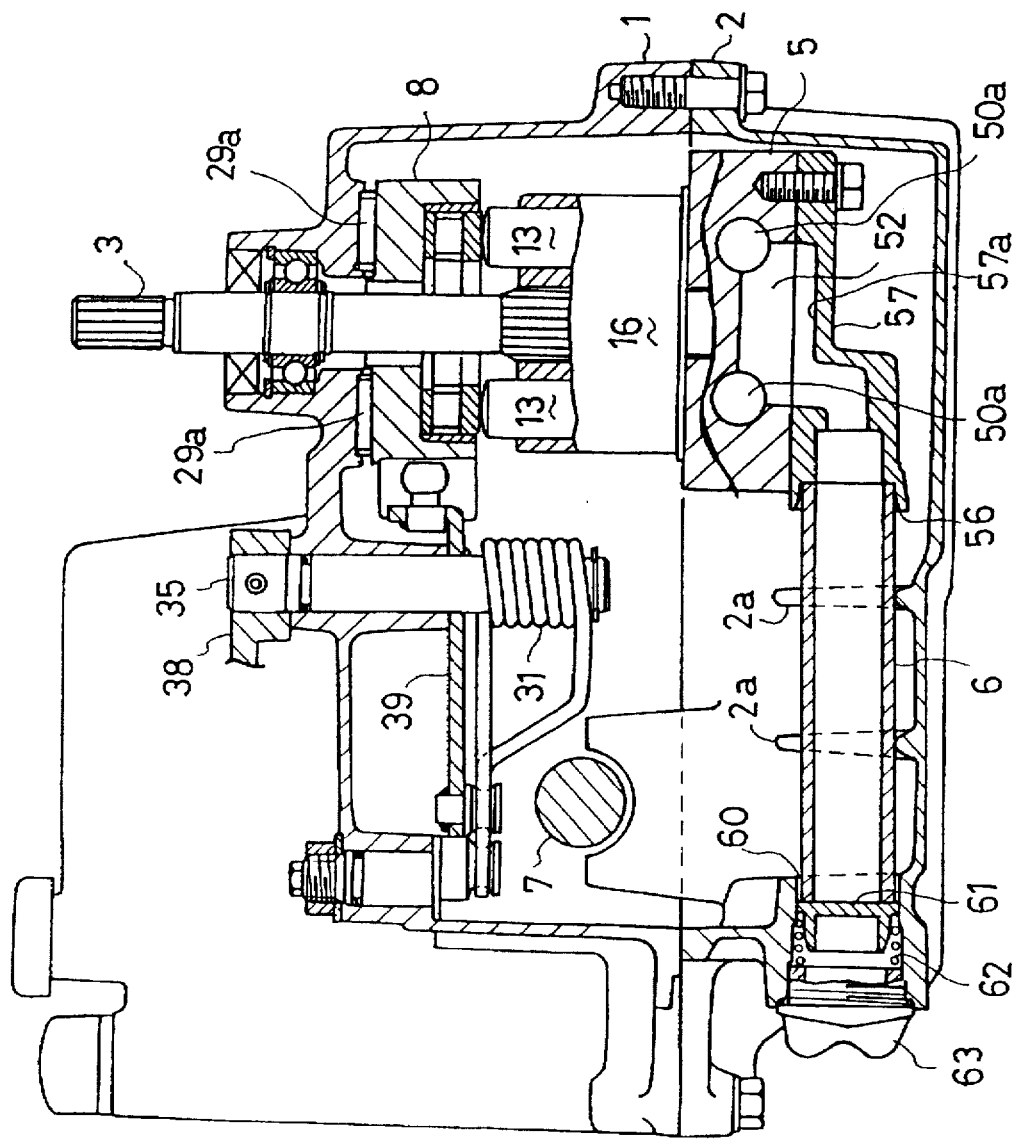
FIG. 14 is a sectional side view of a fourth embodiment of the present invention similar to FIGS. 3, 9 and 11.

This embodiment is shown as a fourth embodiment in FIG. 14, in which center section 5 contains therein a pair of second check valves 50 and a passage 52 connected to inlet ports 50a of the second check valves. Passage 52 is open at the lower horizontal surface of center section 5. A plate member 57 is mounted on the lower horizontal surface to cover passage 52. A bottomed insertion bore 56 is provided at the side surface of plate member 57 for supporting oil filter 6. Passage 52 is open in the bottom of insertion bore 56 through an oil passage 57a provided in plate member 57. Passage 57a is connected with oil filter 6 when inserted into insertion bore 56, whereby passage 52 functions as a suction port for the operating oil supply means.

Figure 15:
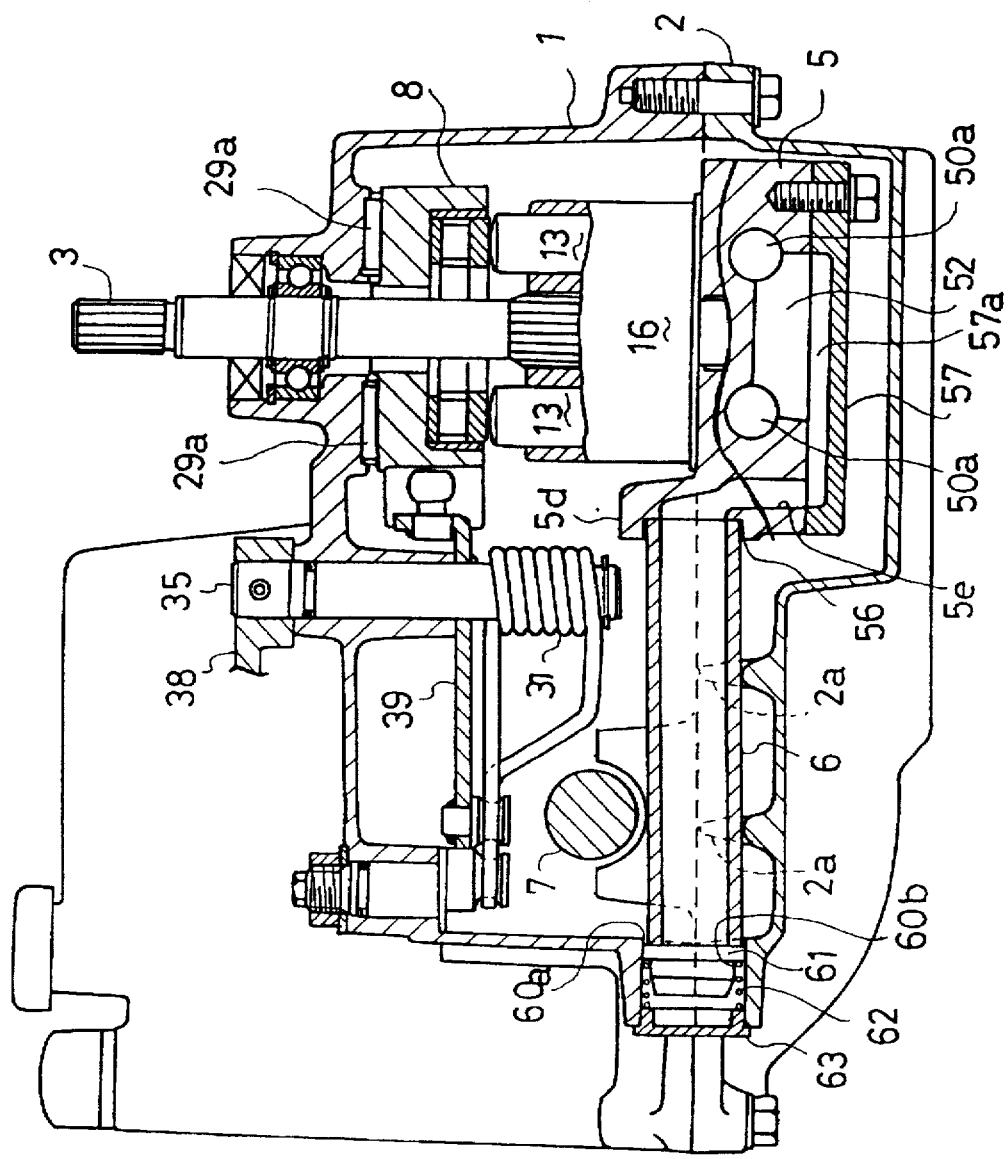
FIG. 15 is a sectional side view of a fifth embodiment of the present invention similar to FIGS. 3, 9, 11 and 14.
Figure 16:
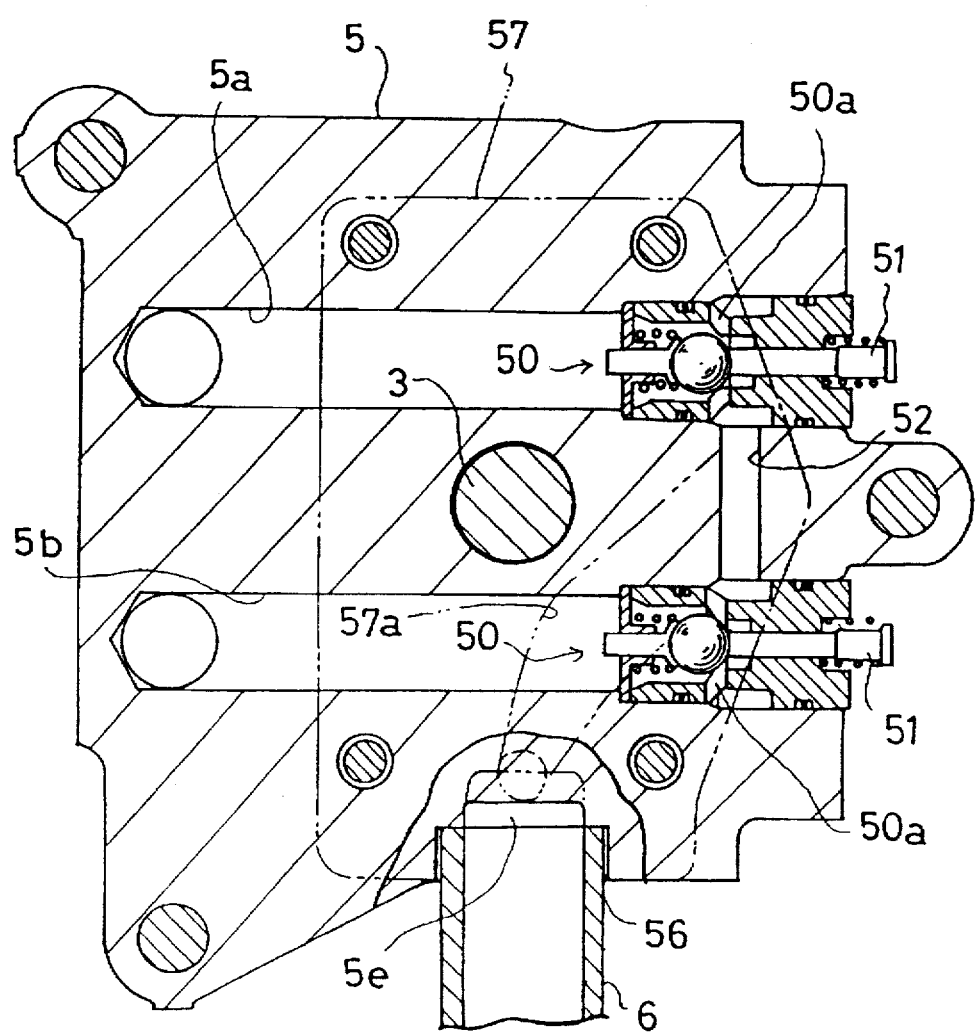
FIG. 16 is a sectional plan view of a center section and charging pump of the fifth embodiment of the invention.

A fifth embodiment is shown in FIGS. 15 and 16, which reduces clogging of oil filter 6 and simplifies the processing of plug-in bore 60. In detail, the combination of center section 5 and plate member 57 is used in the same manner as described above with the reference to the fourth embodiment. A flange 5d, similar to that described with respect to the third embodiment, is provided at the side surface of center section 5, so that a bottomed insertion bore 56 is provided thereon. A passage 52 open at the lower horizontal surface of center section 5 is used as a suction port. Passage 52 communicates with the bottom of insertion bore 56 through an oil passage 57a provided within plate member 57. A passage 5e is provided within center section 5 so as to connect oil passage 57a with oil filter 6 inserted into the insertion bore 56. The axis of insertion bore 56 is positioned on the same plane as the joint surface of the housing. Thus, plug-in bore 60 is positioned at the axis of insertion bore 56 in the plane of the joint surface of the housing, and can be formed without machining, as explained with reference to the third embodiment.

Figure 18:
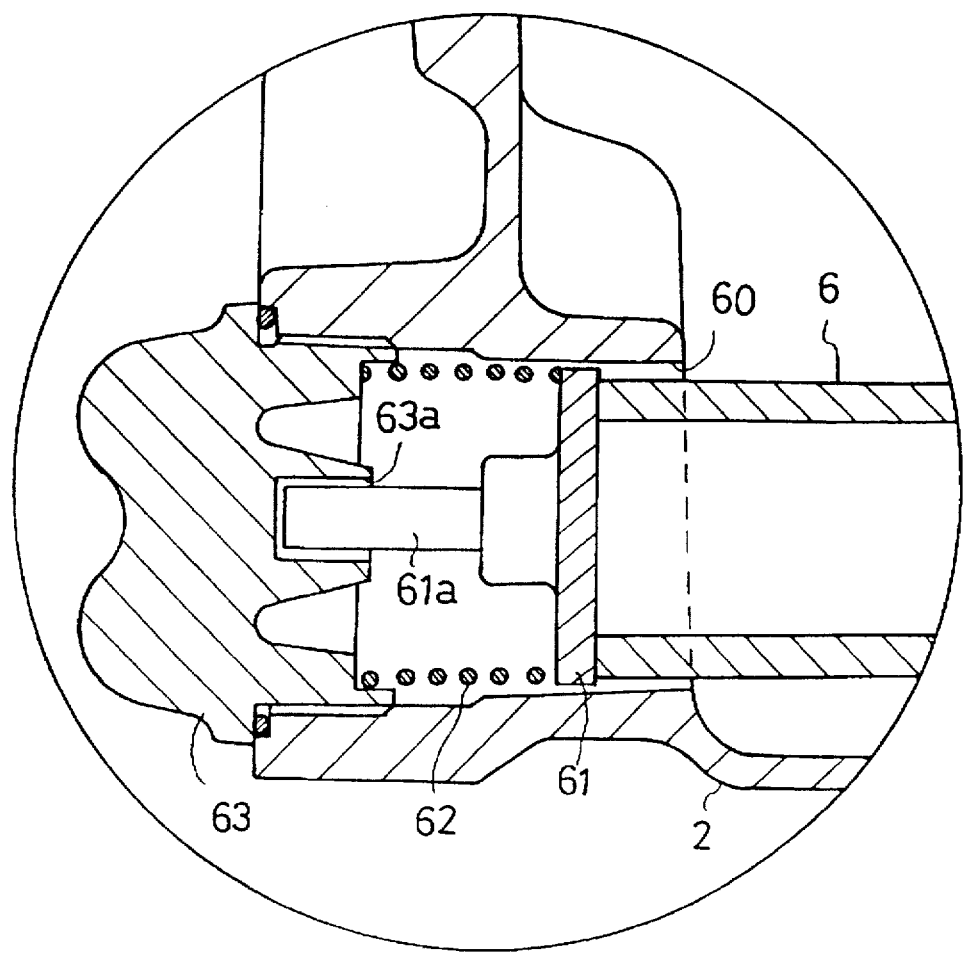
FIG. 18 is a sectional side view of a second embodiment of the cap.
Figure 19:
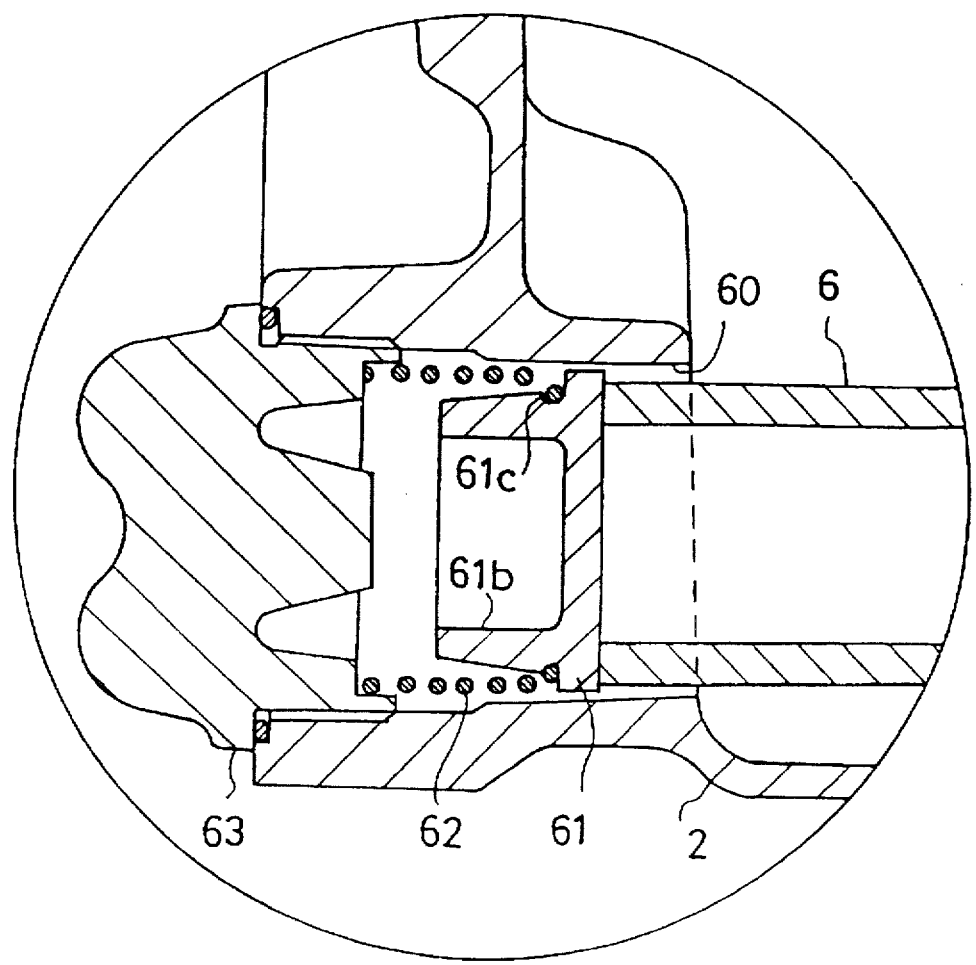
FIG. 19 is a sectional side view of a third embodiment of the cap.
Figure 20:
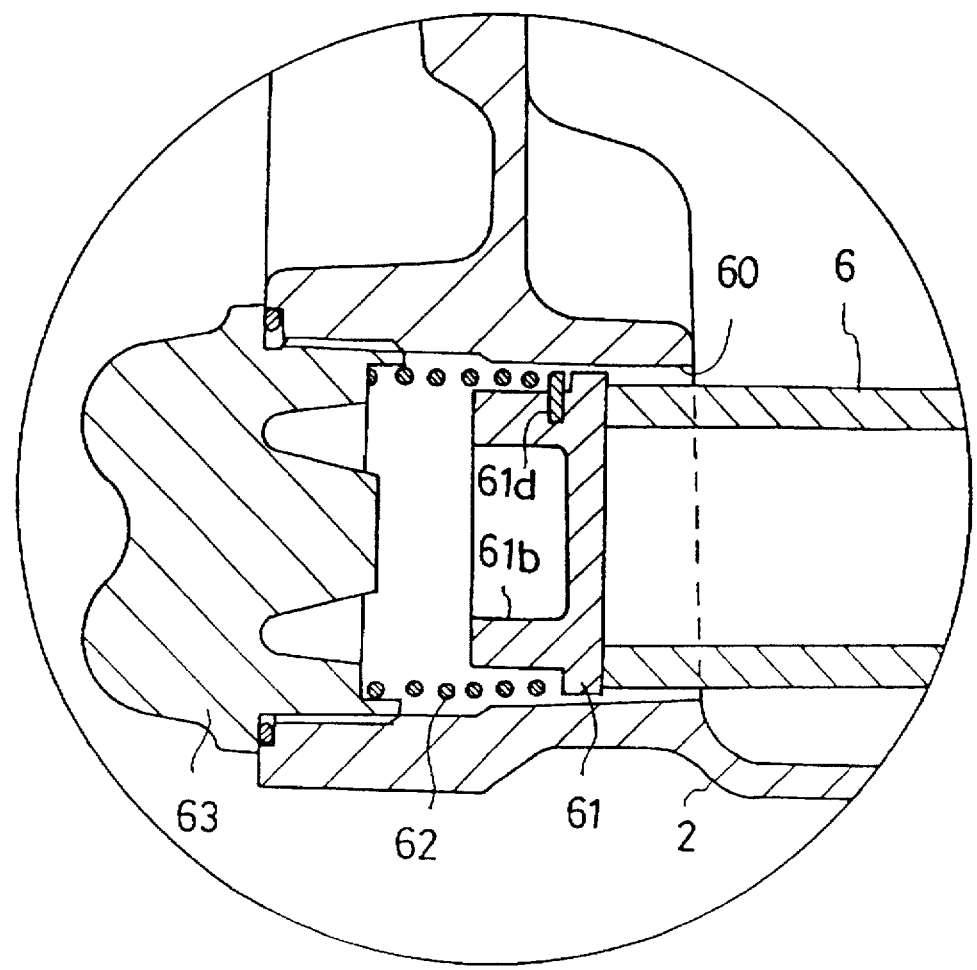
FIG. 20 is a sectional side view of a fourth embodiment of the cap.

A second embodiment of cap 61 is shown in FIG. 18. A projection 61a is formed at the center of cap 61, and has an axial length so that it can be inserted into a recess 63a provided at the center of cover member 63. Projection 61a is pinched to facilitate removal and insertion in cap 61. A third embodiment of cap 61 is shown in FIG. 19. In this embodiment, cap 61 has a boss 61b. An annular groove 61c is formed on the base of boss 61b for fitting thereon a spring 62. Spring 62 is wound at the base of boss 61b into groove 61c and brought into press contact therewith, so that, when spring 62 is pulled out, cap 61 is removed also. In FIG. 20, a fourth embodiment is shown in which a retaining bore 61d is formed at the base of boss 61b of cap 61. A spring 62 is inserted at the base end of cap 61 into retaining bore 61d so as to connect spring 62 with cap 61. Accordingly, when oil filter 6 is inspected, cleaned or exchanged, cover member 63 is removed from the housing and cap 61 and spring 62 are taken out through plug-in bore 60. Then, a tool is inserted into oil filter 6 and is expanded, thereby enabling oil filter 6 to be extracted to the exterior of the housing.

Although several embodiments have been described, they are merely exemplary of the invention and not to be construed as limiting, the invention being defined solely by the appended claims.

What is claimed is:

1. An axle drive unit comprising:
   a housing;
   an oil sump formed in said housing;
   a hydrostatic transmission for driving an axle, said hydrostatic transmission being disposed in said housing;
   oil supply means for supplying operating oil to said transmission, said oil supply means having a suction port into which oil in said oil sump is introduced;
   an oil filter disposed in said oil sump for filtering said oil in said oil sump;
   a plug-in bore open at the surface of said housing for receiving said oil filter; and
   a cover member for covering said plug-in bore and being detachably mounted to said housing, wherein said oil falter is inserted into said housing; through said plug-in bore and is connected with said suction port.

2. An axle drive unit as set forth in claim 1, further comprising:
   a charging pump included in said oil supply means, said charging pump being driven by an input shaft of said hydrostatic transmission; and
   a pump casing disposed in said housing, said pump casing containing therein said charging pump, wherein said plug-in bore is disposed opposite to one surface of said pump casing, and said suction port is open at said one surface of said pump casing.

3. An axle drive unit as set forth in claim 1, wherein:

said hydrostatic transmission includes a hydraulic pump, a hydraulic motor, and a center section for fluidly connecting said hydraulic pump and said hydraulic motor;

a charging pump is included in said oil supply means, said charging pump being driven together with said hydraulic pump by an input shaft of said hydrostatic transmission; and a pump casing is coupled with said center section, said pump casing housing said charging pump, wherein said plug-in bore is opposite to one surface of said pump casing and said suction port is open at said one surface of said pump casing.

4. An axle drive unit as set forth in claim 1, wherein:

said hydrostatic transmission includes a hydraulic pump, a hydraulic motor, and a center section for fluidly connecting said hydraulic pump and said hydraulic motor;

a charging pump is included in said oil supply means, said charging pump being driven together with said hydraulic pump by an input shaft of said hydrostatic transmission; and a pump casing is coupled with said center section, said pump casing housing said charging pump, wherein said plug-in bore is opposite to and across one surface of said pump casing and one surface of said center section, said suction port being open across said one surface of said pump casing and said one surface of said center section.

5. An axle drive unit as set forth in claim 1, wherein:

said hydrostatic transmission includes a hydraulic pump, a hydraulic motor, and a center section for fluidly coupling said hydraulic pump and said hydraulic motor;

a charging pump is included in said oil supply means, said charging pump being driven together with said hydraulic pump by an input shaft of said hydrostatic transmission; and a pump casing is coupled with said center section, said pump casing housing said charging pump, wherein said plug-in bore is opposite to one surface of said center section, said suction port being open at said one surface of said center section.

6. An axle drive unit as set forth in claim 1, wherein:

said hydrostatic transmission includes a hydraulic pump, a hydraulic motor, and a center section for mounting said hydraulic pump and said hydraulic motor;

a closed circuit is provided in said center section for circulating operating oil between said hydraulic pump and said hydraulic motor; and a check valve is included in said oil supply means, said check valve communicating at an inlet side of said oil supply means with said suction port and at an outlet side with said closed circuit, wherein said plug-in bore is opposite to one surface of said center section, said suction port being open at said one side surface of said center section.

7. An axle drive unit comprising:

a housing;

an oil sump formed in said housing;

an axle disposed in said housing;

a hydrostatic transmission disposed in said housing, said hydrostatic transmission being drivingly connected to said axle;

an operating oil supply means fluidly connected to a component of said hydrostatic transmission for supplying operating oil to said transmission, said operating oil supply means having a suction port which is open at the side surface of said component; and a cylindrical oil filter disposed in said oil sump in such a manner that a longitudinal axis thereof is disposed along the inner bottom surface of said housing, wherein said oil filter is mounted to the side surface of said component of said hydrostatic transmission, thereby communicating at the interior of said oil filter with said suction port.

8. An axle drive unit as set forth in claim 7, wherein said operating oil supply means is a charging pump having a substantially vertical rotary axis, said component of said hydrostatic transmission being a pump casing for containing therein said charging pump.

9. An axle drive unit as set forth in claim 7, wherein said operating oil supply means is a hydraulic pump having a substantially vertical rotary axis, said component of said hydrostatic transmission being a center section on which said hydraulic pump is disposed.

10. An axle drive unit as set forth in claim 7, further comprising, power transmitting means disposed in said housing, said power transmitting means drivingly connecting said hydrostatic transmission and said axle, wherein said oil filter is disposed below said axles and adjacent to said power transmitting means.

11. An axle drive unit is set forth in claim 10, further comprising:

a plug-in bore formed in said housing and open at side wall of said housing extending longitudinally of said axle, said plug-in bore being larger in diameter than said oil filter; and a cover member having a diameter large enough to cover said plug-in bore and being detachably mounted with respect to the side wall of said housing.

12. An axle drive unit as set forth in claim 7, further comprising:

a plug-in bore open at side wall surface of said housing, said plug-in bore being larger in diameter than said oil filter;

a cover member having a diameter large enough to cover said plug-in bore and being detachably mounted with respect to the side wall surface of said housing;

a support provided at the periphery of said suction port at said component for receiving the outer periphery of one end of said oil filter;

a support provided at the outer periphery of said plug-in bore for receiving the outer periphery of the other end of said oil filter; and bias means disposed between said cover member and said oil filter for bringing one end of said oil filter into close contact with the side surface of said component.

13. An axle drive unit as set forth in claim 12, further comprising;

a projection formed at the inner bottom surface of said housing and in the axial direction of said oil filter, said projection being shaped at the utmost end for receiving the outer periphery of an intermediate portion of said oil filter.

14. An axle drive unit comprising:
   a housing;
   an oil sump formed in said housing;
   an axle disposed in said housing;
   a hydrostatic transmission disposed in said housing, said hydrostatic transmission having a substantially vertical input shaft into which power from a prime mover is inputted and output shaft drivingly connected to said axles;
   a power transmitting means disposed in said housing, said power transmitting means interlocking said output shaft with said axles;
   oil supply means for supplying operating oil to said transmission, said oil supply means including a charging pump driven by said input shaft of said hydrostatic transmission;
   a pump casing disposed in said housing, said pump casing housing said charging pump;
   a suction port open at one side surface of said pump casing for transporting oil from said oil sump to said charging pump; and
   an oil filter for filtering said oil in said oil sump and supplying said oil to said suction port, said oil filter disposed below said axle adjacent to said power transmitting means.

15. An axle drive unit as set forth in claim 14, further comprising;
   a plug-in bore open at side wall of said housing extending longitudinally of said axle, said plug-in bore being larger in diameter than said oil filter; and
   a cover member having a diameter large enough to cover said plug-in bore and being detachably mounted with respect to the side wall surface of said housing, wherein said oil filter is inserted into said housing through said plug-in bore and connected to said suction port.

16. An axle drive unit as set forth in claim 15, further comprising:
   a first support provided at the periphery of said suction port at said pump casing for receiving the outer periphery of one end of said oil filter;
   a second support provided at the periphery of said plug-in bore for receiving the outer periphery of the other end of said oil filter; and
   bias means disposed between said cover member and the other end of said oil filter for bringing one end of said oil filter into close contact with the side surface of said component.

17. An axle drive unit as set forth in claim 14, further comprising:
   a projection formed in the axial direction of said oil filter at the inner bottom surface of said housing, the utmost end of said projection being shaped to receive the outer periphery of an intermediate portion of said oil filter.

18. An axle drive unit as set forth in claim 14, wherein said oil filter is substantially transverse to said axle.

19. An axle drive unit comprising:
   a housing;
   an oil sump formed in said housing;
   an axle disposed in said housing;
   a hydrostatic transmission disposed in said housing, said hydrostatic transmission being drivingly connected to said axle;
   an operating oil supply means provided at a component of said hydrostatic transmission for supplying operating oil to said transmission, said operating oil supply means having a suction port which is open at the side surface of said component; and
   an elongate oil filter disposed in said oil sump such that a longitudinal axis thereof is disposed along the inner bottom surface of said housing, wherein said oil filter is mounted to the side surface of said component of said hydrostatic transmission, thereby communicating at the interior of said oil filter with said suction port.

20. An axle drive unit as set forth in claim 19, wherein said operating oil supply means is a charging pump having a substantially vertical rotary axis, said component of said hydrostatic transmission being a pump casing for containing therein said charging pump.

21. An axle drive unit as set forth in claim 19, wherein said operating oil supply means is a hydraulic pump having a substantially vertical rotary axis, said component of said hydrostatic transmission being a center section on which said hydraulic pump is disposed.

22. An axle drive unit comprising:
   a housing;
   an oil sump formed in said housing;
   an axle disposed in said housing;
   a hydrostatic transmission disposed in said housing, said hydrostatic transmission being drivingly connected to said axle;
   an operating oil supply means provided at a component of said hydrostatic transmission for supplying operating oil to said transmission, said operating oil supply means having a suction port which is open at the side surface of said component; and
   an oil filter disposed in said oil sump above the inner bottom surface of said housing, wherein said oil filter is mounted to the surface of said component of said hydrostatic transmission, thereby communicating with said suction port at the interior of said oil filter.

23. An axle drive unit as set forth in claim 22, wherein said operating oil supply means is a charging pump having a substantially vertical rotary axis, said component of said hydrostatic transmission being a pump casing for containing therein said charging pump.

24. An axle drive unit as set forth in claim 22, wherein said operating oil supply means is a hydraulic pump having a substantially vertical rotary axis, said component of said hydrostatic transmission being a center section on which said hydraulic pump is disposed.

* * * * *

UNITED STATES PATENT AND TRADEMARK OFFICE
CERTIFICATE OF CORRECTION

PATENT NO. : 5,701,739

DATED : December 30, 1997

INVENTORS : Ohashi et al.

It is certified that an error appears in the above-identified patent and that said Letters Patent is hereby corrected as shown below.

In column 8, line 58, please replace "falter" with --filter-- and line 58, please delete ";" after "housing".

Signed and Sealed this

Twenty-fourth Day of March, 1998

Attest:

BRUCE LEHMAN

Attesting Officer  Commissioner of Patents and Trademarks